(12) United States Patent
Bhogal et al.

(10) Patent No.: US 8,218,939 B2
(45) Date of Patent: Jul. 10, 2012

(54) INTELLIGENT SYNCHRONIZATION OF PORTABLE VIDEO DEVICES

(75) Inventors: Kulvir S. Bhogal, Pflugerville, TX (US); Gregory J. Boss, American Fork, UT (US); Rick A. Hamilton, II, Charlottesville, VA (US); Brian M. O'Connell, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 699 days.

(21) Appl. No.: 12/353,647

(22) Filed: Jan. 14, 2009

(65) Prior Publication Data

US 2010/0178025 A1 Jul. 15, 2010

(51) Int. Cl.
*H04N 5/765* (2006.01)

(52) U.S. Cl. ...................................... 386/200

(58) Field of Classification Search .................. 386/248, 386/280, 295, 207, 291, 329; 710/62; 711/118; 715/772; 707/999.001
See application file for complete search history.

(56) References Cited

U.S. PATENT DOCUMENTS

| | | | |
|---|---|---|---|
| 5,808,662 | A | 9/1998 | Kinney et al. |
| 7,113,773 | B2 | 9/2006 | Quick, Jr. et al. |
| 7,114,172 | B2 | 9/2006 | Lord |
| 7,239,800 | B2 | 7/2007 | Bilbrey |
| 7,246,367 | B2 | 7/2007 | Livonen |
| 7,669,219 | B2 | 2/2010 | Scott, III |
| 7,751,628 | B1 * | 7/2010 | Reisman ...................... 382/232 |
| 2003/0016673 | A1 | 1/2003 | Pendakur et al. |
| 2003/0056220 | A1 | 3/2003 | Thornton et al. |
| 2003/0086694 | A1 | 5/2003 | Davidsson |
| 2003/0099462 | A1 | 5/2003 | Matsugami |
| 2003/0156827 | A1 | 8/2003 | Janevski |
| 2003/0219228 | A1 | 11/2003 | Thiagarajan et al. |
| 2004/0151474 | A1 | 8/2004 | Suh |
| 2005/0246749 | A1 | 11/2005 | Tsuruga et al. |
| 2006/0052067 | A1 | 3/2006 | Singh et al. |
| 2006/0062147 | A1 | 3/2006 | Dougall et al. |
| 2006/0127037 | A1 | 6/2006 | Van Hoff et al. |
| 2006/0174293 | A1 | 8/2006 | Ducheneaut |
| 2006/0224793 | A1 * | 10/2006 | Purlia ............................. 710/62 |
| 2006/0288361 | A1 | 12/2006 | White Eagle et al. |

(Continued)

OTHER PUBLICATIONS

"MyTV ToGo product data" downloaded from http://www.mytvtogo.com/site/products.htm on Aug. 27, 2008.

*Primary Examiner* — Thai Tran
*Assistant Examiner* — Stephen Smith
(74) *Attorney, Agent, or Firm* — Mitch Harris, Atty at Law, LLC; Andrew M. Harris; Mark C. Vallone

(57) ABSTRACT

A method, system and computer program provide a mechanism for intelligently synchronizing a portable video device with a digital video recorder. The intelligent synchronization handles conditions under which a complete transfer of difference content is not possible due to available storage limitations of the portable video device. The synchronization process determines a content difference between the content on the portable video device and the content on the DVR, determines available storage space on the portable video device and compares the available storage space on the portable video device to a size of the content difference. If the size of the content difference is greater than the available storage space, the size of the content difference is reduced, by compression or truncation, without completely excluding video programs from the transfer.

19 Claims, 4 Drawing Sheets

U.S. PATENT DOCUMENTS

| | | | |
|---|---|---|---|
| 2007/0189708 A1* | 8/2007 | Lerman et al. | 386/52 |
| 2007/0283403 A1 | 12/2007 | Eklund et al. | |
| 2008/0010518 A1 | 1/2008 | Jiang et al. | |
| 2008/0086743 A1 | 4/2008 | Cheng et al. | |
| 2008/0189380 A1 | 8/2008 | Bosworth | |
| 2008/0232775 A1* | 9/2008 | Ljolje | 386/96 |
| 2008/0313402 A1* | 12/2008 | Wong et al. | 711/118 |
| 2009/0044216 A1 | 2/2009 | McNicoll | |
| 2009/0074380 A1* | 3/2009 | Boston et al. | 386/83 |
| 2009/0164667 A1* | 6/2009 | Zhang et al. | 709/248 |
| 2009/0199013 A1 | 8/2009 | Raciborski et al. | |
| 2009/0220216 A1 | 9/2009 | Marsh et al. | |
| 2009/0245756 A1* | 10/2009 | Cirrincione et al. | 386/124 |
| 2009/0263101 A1 | 10/2009 | Rudolph et al. | |
| 2010/0107104 A1* | 4/2010 | Bruce et al. | 715/772 |
| 2011/0030012 A1 | 2/2011 | Diaz Perez | |

* cited by examiner

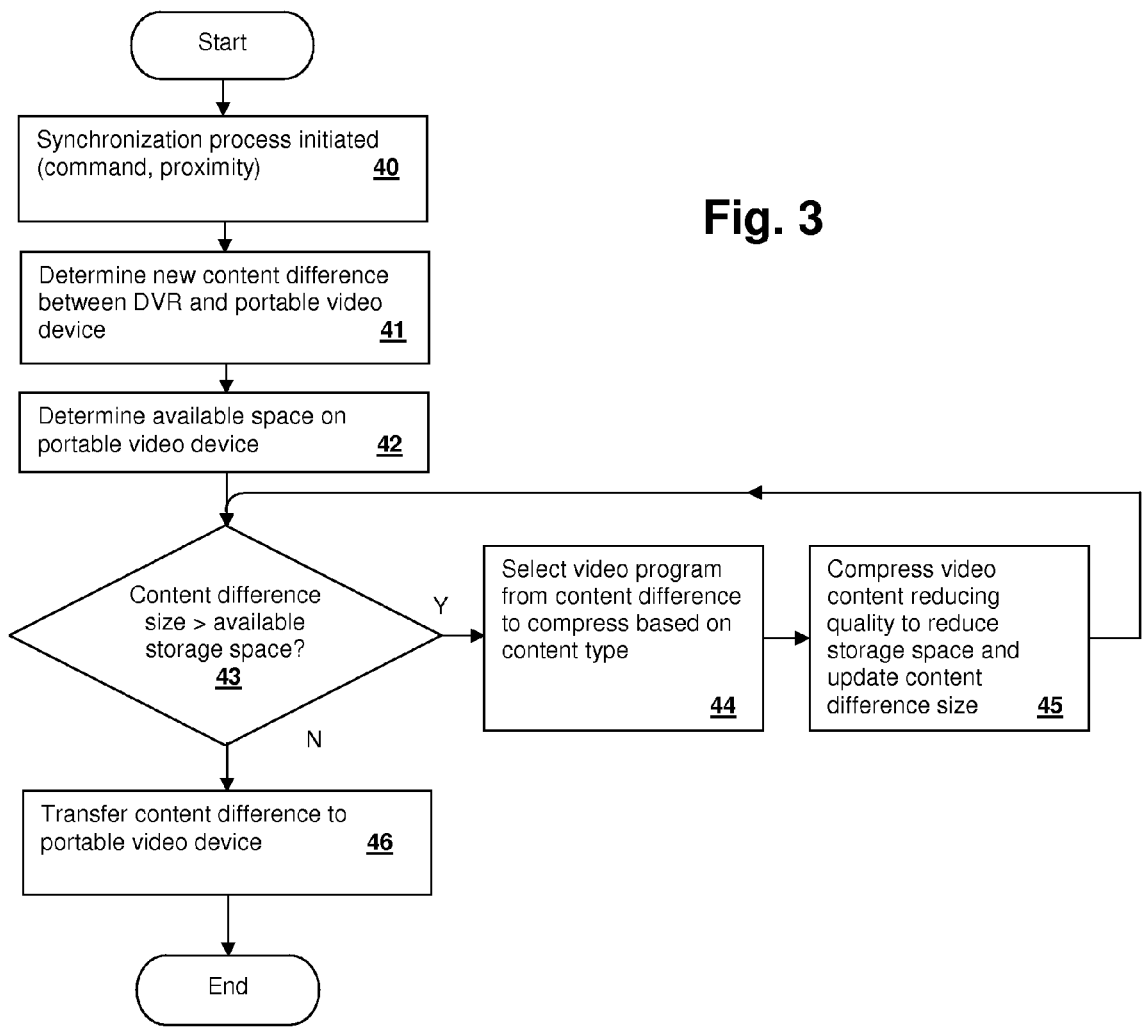

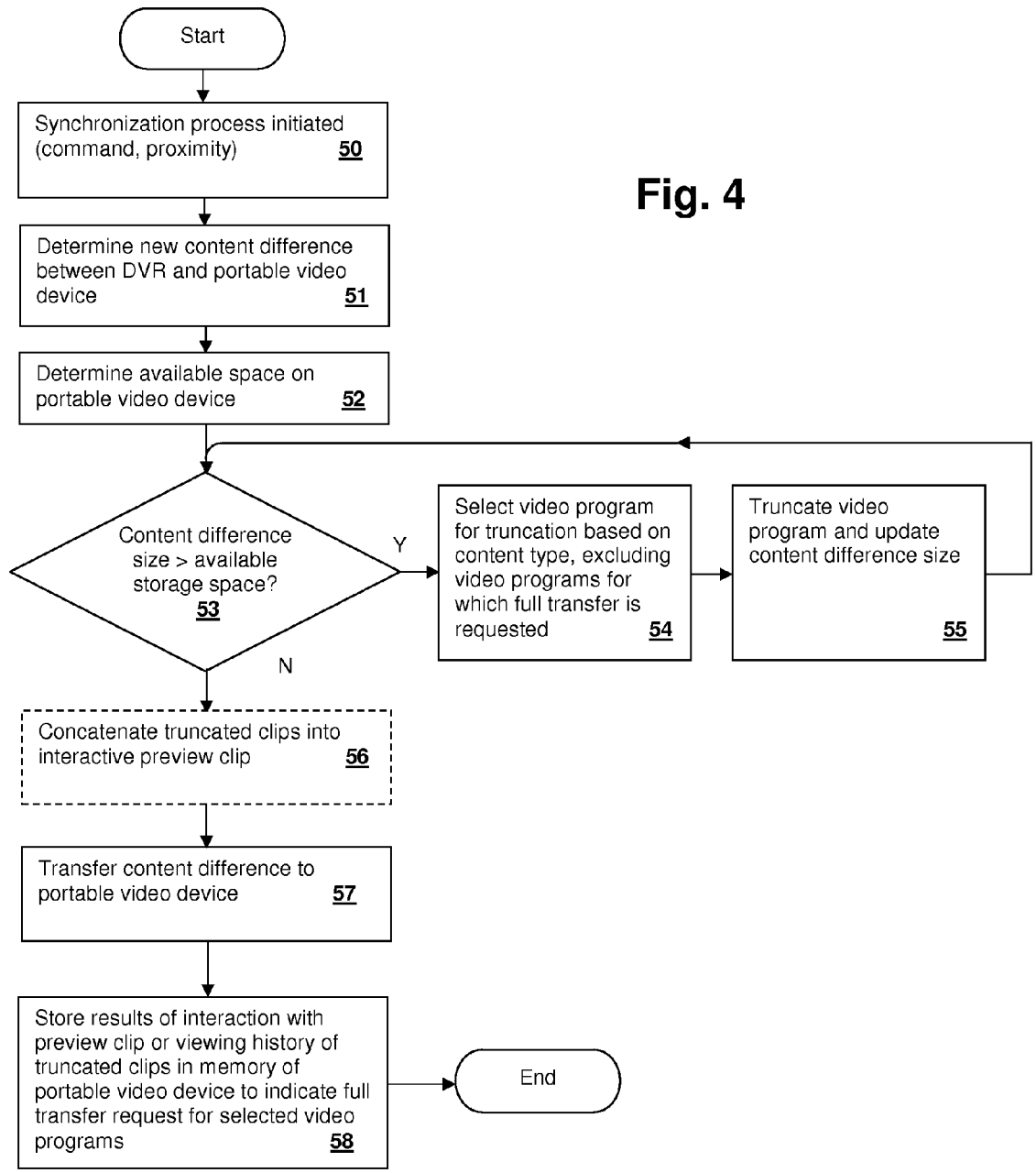

INTELLIGENT SYNCHRONIZATION OF PORTABLE VIDEO DEVICES

BACKGROUND OF THE INVENTION

1. Field of the Invention

The present invention is related to consumer portable video devices, and more particularly to a method and system that intelligently synchronize the contents of a portable video device with content recorded by a digital video recorder (DVR).

2. Description of Related Art

Synchronization software and hardware mechanisms provide enhanced portability in portable video devices such as personal video recorders (PVRs). Recently, portable personal devices that were traditionally audio playback-only devices (e.g., so-called "mp3 players") have been enhanced by the addition of video playback capability, providing portable video players. Typical synchronization techniques used in conjunction with such devices either automatically match the content between the portable device and another device, or provide the user with a selection of which content to transfer, in particular when there is insufficient space on the portable device. The user may also delete content from the portable device in order to make room for the new content that has not been synchronized.

However, when the difference between the content of the portable device and the other device is in excess of the available storage capability of the portable device, it may not be desirable under all circumstances to require the user to perform the above-described tasks in order to synchronize content. In particular, selection of a subset of video content or selection of video content to delete from the portable device can be a time-consuming process, which runs counter to the idea of portability. Further, selection of a subset of the new content that has been recorded on the DVR for transfer to the portable video device provides that some content may be missed that the user of the portable device may want to review further.

Therefore, it would be desirable to provide a method and system that can provide for synchronizing content between a DVR and a portable video device when insufficient space is present on the portable video device without requiring the user to manually select content to transfer or select content to delete from the portable video device. It would further be desirable to provide such a method and system that provide that new, unviewed content will not be missed.

BRIEF SUMMARY OF THE INVENTION

The invention is embodied in a method, system and a computer program product that synchronize content between a portable video device such as a personal video recorder (PVR) and a digital video recorder (DVR). The synchronization may be performed by a program executed by a general-purpose computer such as a personal computer (which may also serve as the DVR) or within a DVR. Another program executed within the portable video device provides cooperation with the synchronization program and can provide further storage and user input for various features in accordance with embodiments of the invention, and in some embodiments, provide the synchronization function by implementing a "pull" type synchronization architecture.

The method and system of the present invention, as operated by computer program products of the present invention, initiate a synchronization process between the portable video device and the DVR. The synchronization is performed over a wired or wireless interface between the DVR and the portable video device. The synchronization process determines a content difference between the content on the portable video device and the content on the DVR, determines available storage space on the portable video device and compares the available storage space on the portable video device to the size of the content difference. If the size of the content difference is greater than the available storage space, the size of the content difference is reduced, without completely excluding video programs from the transfer.

The size of the content difference is reduced by either automatically truncating multiple video programs that comprise the content difference, or by compressing at least one video program of the content difference in a manner that reduces quality and storage requirements. The reduced size content difference is then transferred to the portable video device over the interface.

If the size of the content difference is reduced by compression, the particular video program(s) compressed may be selected according to a program type, e.g., compression may be applied to news or information programs, but not to movies or sports programs. If the size of the content difference is reduced by truncation, a number of truncated clips may be concatenated to provide a preview of content that was not completely transferred. Further, selection of a subset of the truncated clips may be stored as an indication in a memory of the portable video device that the user desires the corresponding full programs. The stored indication is then used by the next synchronization process to transfer the complete program(s). The selection may be explicitly based on a selection by the user, or implied from the user's viewing of particular programs, which are then selected for complete transfer.

The foregoing and other objectives, features, and advantages of the invention will be apparent from the following, more particular, description of the preferred embodiment of the invention, as illustrated in the accompanying drawings.

BRIEF DESCRIPTION OF THE SEVERAL VIEWS OF THE DRAWING

The novel features believed characteristic of the invention are set forth in the appended claims. The invention itself, however, as well as a preferred mode of use, further objectives, and advantages thereof, will best be understood by reference to the following detailed description of the invention when read in conjunction with the accompanying Figures, wherein like reference numerals indicate like components, and:

FIG. 3 is a flowchart of a method in accordance with an embodiment of the present invention.

FIG. 4 is a flowchart of a method in accordance with another embodiment of the present invention.

DETAILED DESCRIPTION OF THE INVENTION

The present invention relates to synchronization methods and systems that synchronize content from a digital video recorder (DVR) with content on a portable video device such as a personal video recorder (PVR). When a synchronization process is initiated, a content difference between the portable video device and the DVR is determined, and the available space on the portable video device is compared with the size of the content difference. If sufficient space is unavailable on the portable device to transfer the full content difference, one or more video programs is either compressed or truncated to reduce the size of the content difference to fit within the storage space available on the portable video device. The content difference is then transferred to the portable video device. In one embodiment of the invention, truncated video programs are used as "previews" and either user selection or viewer history is used to determine which video programs should be fully transferred to the portable video device at the next synchronization.

Figure 1:
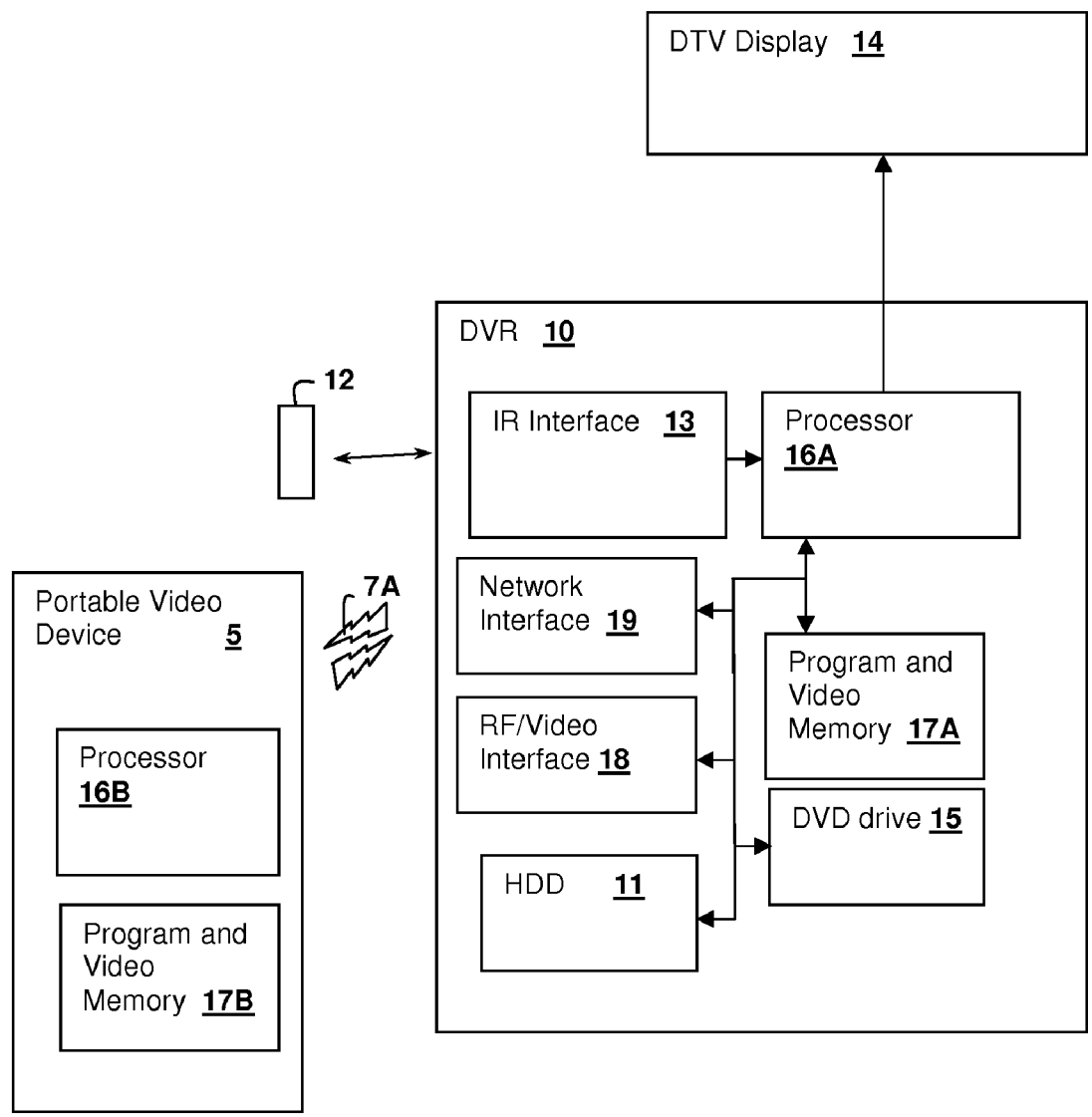
FIG. 1 is a block diagram illustrating a system according to an embodiment of the present invention.

Referring now to FIG. 1, a system in accordance with an embodiment of the invention is shown. A digital video recorder (DVR) 10 is connected to an external digital television (DTV) display 14, and is also coupled to a portable video device 5, as illustrated, by a wireless interface 7A, such as a Bluetooth or wireless local area network (WLAN) interface. Portable video device includes a processor 16B and a program/video memory 17B that contains program instructions for execution by processor 16B in support of synchronization between DRV 10 and portable video device 5. DVR 10 also contains a processor 16A for executing program instructions that stored in a program/video memory 17 that implement the synchronization techniques of the present invention. While the description of the synchronization technique as described herein generally refer to a push-type synchronization, in which DVR 10 controls the transfer process, in an alternative embodiment, pull-type synchronization can be initiated by and controlled by a program executed by processor 16B of portable video device 5. Therefore, the location of the program that implements the methods described in further detail below is understood to be flexible and is not a limitation of the present invention. Functionality of the synchronization operations described below may also be split between two programs, one within portable video device 5 and executed by processor 16B and another within DVR 10 and executed by processor 16A.

User input to portable video device 5 is generally provided to processor 16B via a touchscreen or buttons integrated on the housing of portable video device 5. A remote control 12 is used to control operation of DVR 10, in the exemplary embodiment according to methods of the present invention, in order to provide user input. However, it is understood that other user input methodologies can be employed, such as buttons and other controls integral to DVR 10. DVR 10 includes an infrared (IR) interface 13 for receiving commands from remote control 12 A radio-frequency (RF)/video interface 18 receives video signals or RF signals from broadcast, closed-circuit or other video streaming sources and provides them for selection by processor 16 for ultimate display by DTV display 14. A network interface 19 provides connection to public or private networks such as the Internet, for receiving additional information such as program guide information for generating a user interface used to schedule recording within DVR 10. A digital versatile disc (DVD) drive 15 and hard disk drive (HDD) 11 are also included in DVR 10 both for recording video program and other information. When a synchronization process is initiated between portable video device 5 and DVR 5, either by a user input or proximity of the portable video device 5 to DVR 10 in certain wireless configurations, programs within portable video device 5 and DVR 10 interact to transfer content that is different between DVR 10 and portable video device 5.

Since DVR 10 generally contains more storage space than portable video device 5, the synchronization process described below is illustrated as a uni-directional synchronization that transfers new content recorded by DVR 10 to portable video device 5. However, techniques of the present invention can be used in bi-directional synchronization as well as uni-directional synchronization from portable video device 5 to DVR 10. In general, the techniques of the present invention can be used any time the target device for video transfer has insufficient storage capacity to receive the content difference between the source device and the target device. Further, it is understood that the techniques of the present invention do not supplant other synchronization techniques that filter the content to be transferred. For example, the synchronization techniques of the present invention may also avoid transferring portions of video programs that have already been viewed, in order to reduce storage space, may ignore content that is older than a certain date or time, or content that has been previously selected or categorized as not intended for transfer. Further, fully automatic transfer is not a requirement of the present invention, as the content difference size reduction techniques of the present invention can be applied to a manually selected list of content to transfer, as well as to automatically determined content differences.

Figure 2:
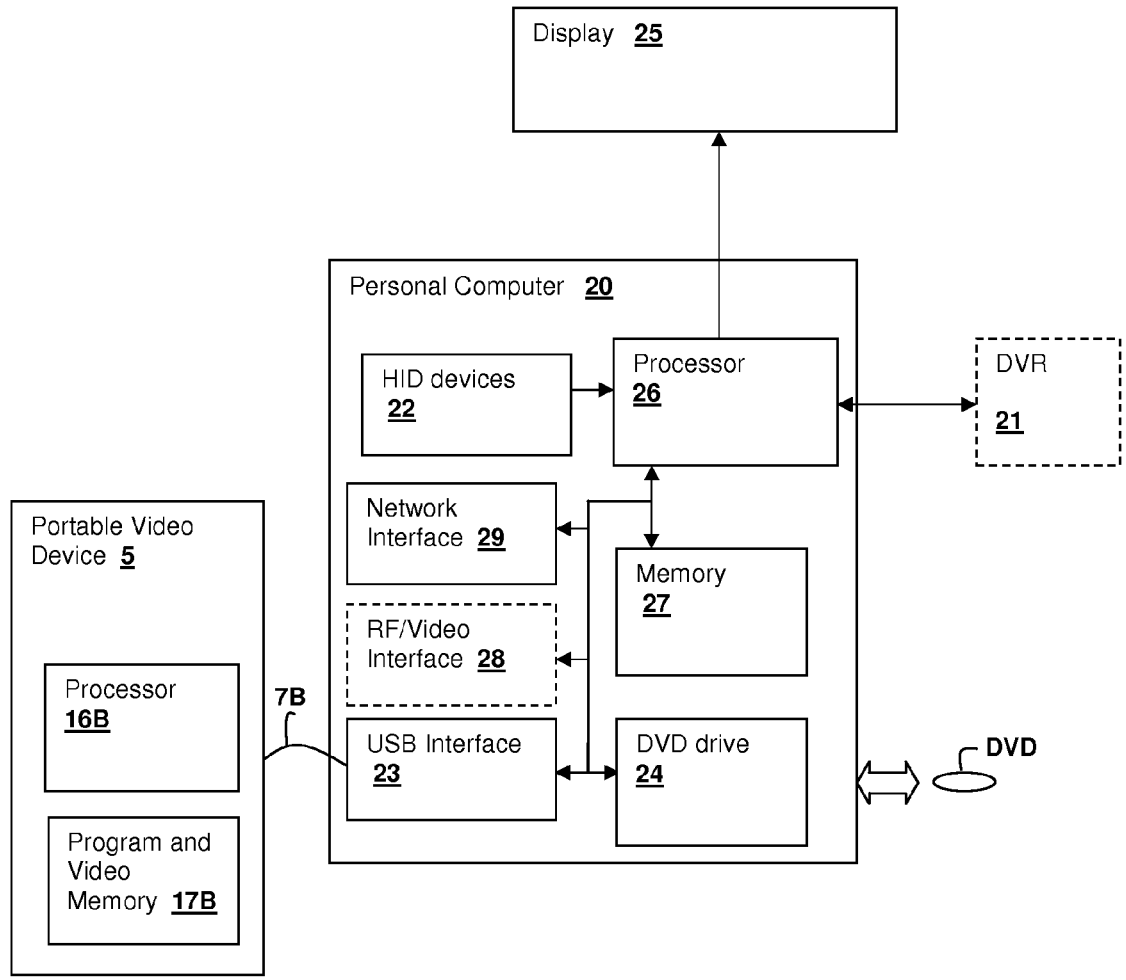
FIG. 2 is a block diagram illustrating a system in accordance with another embodiment of the present invention.

Referring now to FIG. 2, a system in accordance with another embodiment of the invention is illustrated, in which a personal computer system may implement a DVR, synchronize video obtained from other external sources such as the Internet or pre-recorded media, or controls an external DVR 21. Personal computer 20, includes a processor 26 coupled to a memory 27 for storing program instructions including program instructions for controlling synchronization between external DVR 21 and/or between personal computer 20 and portable video device 5. Personal computer 20 is interfaced to portable video device 5 by a suitable wired or wireless interface, which is illustrated here as a USB interface cable 7B connected to a USB interface 23 of personal computer 20. The program within memory 27 for controlling synchronization according to the present invention may be integrated in a DVR program that also provides control and other functionality as generally associated with DVR operations, or may be provided a stand-alone application, in accordance with methodologies described in further detail below. The program may be loaded into memory 27 or HDD 23 from a DVD drive 24 from a data storage media forming a computer program product in accordance with an embodiment of the present invention, such as DVD disc DVD. In order to receive video information from closed-circuit or broadcast sources, personal computer 20 includes an RF/Video interface 28. However, techniques in accordance with an embodiment of the present invention can be performed on video received from a network interface 29 and RF/Video interface 28 is not required in such embodiments. Further, as mentioned above, if personal computer is used to provide synchronization between external DVR 21 and portable video device 5, then there is no requirement that personal computer 20 provide any source of video content. Personal computer 20 also includes a human interface device (HID) interface 22 for connection of HIDs, such as keyboards and pointing devices. Personal computer 20 is also illustrated as connected to an external display 25. However, if personal computer 20 is a laptop, tablet or other integrated device, display 25 will generally be internal to personal computer 20.

Referring now to FIG. 3, a method according to an embodiment of the present invention is illustrated in a flowchart. A synchronization process is initiated between the portable video device and the DVR according to a command or via proximity detection (step 40) and a new content difference is determined between the DVR and the portable video device (step 41). The available storage space on the portable video device is determined (step 42) and the content difference size is compared to the available storage space on the portable video device (decision 43). If the storage space available on the portable video device is sufficient to receive the full content difference (decision 43), then the content is transferred to the portable video device (step 46). Otherwise, a video program is selected (step 44), which may be based on a content type (e.g., compress news programs before sports programs), the video program is compressed, reducing video quality and storage space requirements for the selected program and the content difference size is updated (step 45). Step 44 and step 45 are repeated until decision 43 indicates that the content difference will fit within the available storage space on the portable video device, which may include adjusting the compression factor of the entire content difference, or selected programs based on program type, so that step 45 may be repeated for the same video program if necessary. Finally, once the content difference has been reduced so that the storage space available on the portable video device is sufficient to receive the content difference (decision 43), then the content is transferred to the portable video device (step 46). The algorithm may also be terminated if the compression applied exceeds a usable limit and a warning may be issued. Alternatively, the algorithm may selectively change to a truncation algorithm as illustrated below in FIG. 4.

Referring now to FIG. 4, a method according to another embodiment of the present invention is illustrated in a flowchart. A synchronization process is initiated between the portable video device and the DVR according to a command or via proximity detection (step 50) and a new content difference is determined between the DVR and the portable video device (step 51). The available storage space on the portable video device is determined (step 52) and the content difference size is compared to the available storage space on the portable video device (decision 53). If the storage space available on the portable video device is insufficient to receive the full content difference (decision 53), a video program is selected for truncation (step 54), which may be based on a content type (e.g., truncate news programs before sports programs), but excluding programs which are flagged for full transfer by an indication stored in the portable video device that directs the synchronization process to fully-transfer selected video programs. The selected video program is truncated reducing storage space requirements for the selected program and the content difference size is updated (step 55). Step 54 and step 55 are repeated until decision 53 indicates that the content difference will fit within the available storage space on the portable video device, which may include adjusting the length of the truncated clips for the entire content difference, or for selected programs based on program type, so that step 55 may be repeated for the same video program if necessary. Finally, once the content difference has been reduced so that the storage space available on the portable video device is sufficient to receive the content difference (decision 53), the truncated clips are optionally concatenated into an interactive "preview" clip (step 56), then the content is transferred to the portable video device (step 57). After the transfer is complete, the portable video device stores the result of an interaction of the user with the interactive preview clip in memory, or uses the viewing history of the truncated clips to flag the truncated clips in memory, and stores an indication that a full synchronization of the indicated content is requested. At a next synchronization, full transfer is performed (thereby avoiding truncation in step 54) for the selected content (step 58). A rating scheme may be employed to prefer some video programs over others that have been flagged by the user interacting with a program within the portable video device, so that if sufficient space is again unavailable at the next synchronization, higher-ranked programs will be transferred whole or truncated/compressed less than lower-ranked programs.

Other techniques for flagging/ranking content include indications received from peer-to-peer systems that rank programs, retrieval of rating information from "critic" databases, e.g., prefer programs rated "5-star", and other sources of information that would indicate the desirability of some content over others, which may be generalized rankings, or tailored to preferences of a particular user.

The original full content of the video programs that have been truncated by the method illustrated in FIG. 4 or compressed by the method illustrated in FIG. 3 may be subsequently retrieved remotely, by network transfer, using an association of the truncated/compressed video programs/clips with the original content, e.g., by a unique identifier, once content has been removed from the portable video device to provide sufficient storage space. The synchronization processes described above may themselves be provided over a remote network, so that as storage space is made available, subsequent synchronization attempts can be used to retrieve media that was previously truncated, and optionally to retrieve copies of media that were compressed. Further, the truncation length and/or compression factor can be based on user selection and/or user category preferences, in addition to determining whether or not truncation or compression should be applied to difference content.

While the invention has been particularly shown and described with reference to the preferred embodiments thereof, it will be understood by those skilled in the art that the foregoing and other changes in form, and details may be made therein without departing from the spirit and scope of the invention.

What is claimed is:

1. A method of synchronizing first content of a portable video device with second content of another digital video recording device, the method comprising:

a processor initiating a synchronization process between the portable video device and the digital video recording device;

the processor determining a content difference between the first content on the portable video device and the second content on the digital video recording device;

the processor determining available storage space on the portable video device;

the processor comparing the available storage space on the portable video device to a size of the content difference;

responsive to the processor determining that the size of the content difference is greater than the available storage space, the processor determining an amount of content to truncate from multiple video programs within the content difference or to remove from at least one video program within the content difference by compression in order to reduce the size of the content difference so that the content difference can be stored in the available storage space;

responsive to the processor determining the amount of content, the processor producing a reduced size content difference, wherein the processor producing the reduced size content difference comprises the processor automatically truncating the multiple video programs within the content difference according to a result of the processor determining the amount of content to reduce a storage space requirement of the multiple video programs or the processor compressing the at least one video program of within the content difference according to a result of the processor determining the amount of content to reduce a quality and storage space requirement of the at least one video program; and the processor transferring the reduced size content difference to the portable video device over an interface between the portable video device and the digital video recorder.

2. The method of claim 1, wherein the processor comparing the available storage space on the portable video device to the size of the content difference comprises the processor determining that insufficient storage space is available on the portable video device and wherein the processor determining the amount of content is responsive to the processor determining that insufficient storage space is available on the portable video device.

3. The method of claim 1, further comprising:
responsive to the processor determining that the size of the content difference is greater than the available storage space, the processor selecting the at least one video program within the content difference according to a first video program type of the at least one video program; and
the processor determining that another video program of a second video type in the content difference is not to be compressed, wherein the second video program type is preferred over the first video program type.

4. The method of claim 1, wherein the processor comparing the available storage space on the portable video device to the size of the content difference comprises the processor determining that insufficient storage space is available on the portable video device, wherein the processor determining the amount of content is responsive to the processor determining that insufficient storage space is available on the portable video device, and wherein the processor transferring the reduced size content difference to the portable video device over the interface comprises the processor transferring the truncated multiple video programs to the portable video device over the interface.

5. The method of claim 1, further comprising:
the processor concatenating the truncated multiple video programs to generate a preview program prior to the transferring;
wherein the processor transferring the reduced size content difference to the portable video device over the interface comprises the processor transferrin the preview program to the portable video device over the interface.

6. The method of claim 1, further comprising:
the portable video device receiving user input indicating a preference among the multiple video programs; and
the processor responsive to a subsequent initiation of another synchronization process between the portable video device and the digital video recording device, transferring preferred ones of the multiple video programs in non-truncated versions in preference over non-preferred ones of the multiple video programs.

7. The method of claim 6, wherein the user input indicating the preference among the multiple video programs is a user input selecting the multiple video programs for viewing, and wherein the method further comprises the processor determining that the multiple video programs are preferred over other video programs within the content difference that have not been selected for viewing.

8. A system for recording digital video, the system comprising;
a processor;
a computer-readable memory coupled to the processor;
a computer-readable tangible storage device coupled to the processor;
program instructions, stored on the storage device for execution by the processor via the memory, to initiate a synchronization process between a portable video device and a digital video recording device;
program instructions, stored on the storage device for execution by the processor via the memory, to determine a content difference between the first content on the portable video device and second content on the digital video recording device;
program instructions, stored on the storage device for execution by the processor via the memory, to determine available storage space on the portable video device;
program instructions, stored on the storage device for execution by the processor via the memory, to compare the available storage space on the portable video device to a size of the content difference;
program instructions, stored on the storage device for execution by the processor via the memory, to, responsive to determining that the size of the content difference is greater than the available storage space, determine an amount of content to truncate from multiple video programs within the content difference or to remove from at least one video program within the content difference by compression in order to reduce the size of the content difference so that the content difference can be stored in the available storage space;
program instructions, stored on the storage device for execution by the processor via the memory, to, responsive to determining the amount of content, produce a reduced size content difference, wherein the program instructions to produce the reduced size content difference automatically truncate the multiple video programs within the content difference according to a result of executing the program instructions that determine the amount of content to reduce a storage space requirement of the multiple video programs or compress the at least one video program within the content difference according to a result of executing the program instructions that determine the amount of content to reduce a quality and storage space requirement of the at least one video program; and
program instructions, stored on the storage device for execution by the processor via the memory, to transfer the reduced size content difference to the portable video device over an interface between the portable video device and the digital video recorder.

9. The system of claim 8, wherein the program instructions to compare determine that insufficient storage space is available on the portable video device, and wherein the program instructions determine the amount are responsive to determining that insufficient storage space is available on the portable video device.

10. The system of claim 8, further comprising:
program instructions, stored on the storage device for execution by the processor via the memory, to select the at least one video program within the content difference according to a first video program type of the at least one video program; and
program instructions, stored on the storage device for execution by the processor via the memory, to determine that another video program of a second video program type in the content difference is not to be compressed, wherein the second video program type is preferred over the first video program type.

11. The system of claim 8, wherein the program instructions to compare determine that insufficient storage space is available on the portable video device, wherein the program instructions to determine the amount of content are responsive to determining that insufficient storage space is available on the portable video device, and wherein the program instructions to transfer the reduced size content difference to the portable video device over the interface transfer the truncated multiple video programs to the portable video device over the interface.

12. The system of claim 8, further comprising:
program instructions, stored on the storage device for execution by the processor via the memory, to, before transferring the reduced size content difference to the portable video device over the interface, concatenate the truncated multiple video programs to generate a preview program;
wherein the program instructions to transfer the reduced size content difference to the portable video device over the interface transfer the preview program to the portable video device over the interface.

13. The system of claim 8, further comprising:
program instructions, stored on the storage device for execution by the processor via the memory, to receive user input to the portable video device indicating a preference among the multiple video programs; and
program instructions, stored on the storage device for execution by the processor via the memory, to, responsive to subsequent initiation of another synchronization process between the portable video device and the digital video recording device, transfer preferred ones of the multiple video programs in non-truncated versions in preference over non-preferred ones of the multiple video programs.

14. The system of claim 13, wherein the user input indicating the preference among the multiple video programs is a user input selecting the multiple video programs for viewing, and wherein the system further comprises program instructions, stored on the storage device for execution by the processor via the memory, to determine that the multiple video programs are preferred over other video programs within the content difference that have not been selected for viewing.

15. A computer program product for synchronizing first content stored on a portable video device with second content stored on a digital video recorder, the computer program product comprising:
a computer-readable tangible storage device;
program instructions, stored on the storage device, to initiate a synchronization process between the portable video device and the digital video recording device;
program instructions, stored on the storage device to determine a content difference between the first content on the portable video device and the second content on the digital video recording device;
program instructions, stored on the storage device, to determine available storage space on the portable video device;
program instructions, stored on the storage device, to compare the available storage space on the portable video device to a size of the content difference;
program instructions, stored on the storage device to, responsive to determining that the size of the content difference is greater than the available storage space, determine an amount of content to truncate from multiple video programs within the content difference or to remove from at least one video program within the content difference in order to reduce the size of the content difference so that the content difference can be stored in the available storage space;
program instructions, stored on the storage device, to, responsive to determining the amount of content, produce a reduced size content difference, wherein the program instructions to produce the reduced size content difference automatically truncate the multiple video programs within the content difference according to a result of executing the program instructions that determine the amount of content to reduce a storage space requirement of the multiple video programs or compress the at least one video program of the content difference according to a result of executing the program instructions that determine the amount of content to reduce a quality and storage space requirement of the at least one video program; and
program instructions, stored on the storage device, to transfer the reduced size content difference to the portable video device over an interface between the portable video device and the digital video recorder.

16. The computer program product of claim 15, wherein the program instructions to compare determine that insufficient storage space is available on the portable video device, and wherein the program instructions to determine the amount of content are responsive to determining that insufficient storage space is available on the portable video device.

17. The computer program product of claim 15, further comprising:
program instructions, stored on the storage device, to select the at least one video program within the content difference according to a first video program type of the at least one video program; and
program instructions, stored on the storage device, to determine that another video program of a second video program type in the content difference is not to be compressed, wherein the second video program type is preferred over the first video program type.

18. The computer program product of claim 15, wherein the program instructions to compare determine that insufficient storage space is available on the portable video device, wherein the program instructions to determine the amount of content to truncate are responsive to determining that insufficient storage space is available on the portable video device, and wherein the program instructions to transfer the reduced size content difference to the portable video device over the interface transfer the truncated the multiple video programs to the portable video device over the interface.

19. The computer program product of claim 15, further comprising:
program instructions, stored on the storage device, to, before transferring the reduced size content difference to the portable video device over the interface, to concatenate the truncated multiple video programs to generate a preview program;
wherein the program instructions to transfer the reduced size content difference to the portable video device over the interface transfer the preview program to the portable video device over the interface.

* * * * *